June 27, 1961   H. M. FINNISTON ET AL   2,990,352
METAL SHEATHED BODIES
Filed Feb. 21, 1950
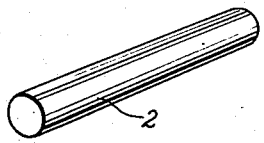
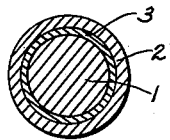
INVENTORS
HAROLD MONTAGUE FINNISTON
LESLIE MARK WYATT
OLIVER SIDNEY PLAIL
BY
Robert B Pearson
ATTORNEY

United States Patent Office 2,990,352
Patented June 27, 1961

2,990,352
METAL SHEATHED BODIES

Harold Montague Finniston, Leslie Mark Wyatt, and Oliver Sidney Plail, London, England, assignors, by mesne assignments, to the United States of America as represented by the United States Atomic Energy Commission
Filed Feb. 21, 1950, Ser. No. 145,407
7 Claims. (Cl. 204—193.2)

This invention relates to uranium-containing bodies for use in nuclear fission reactors.

Uranium bodies employed in carbon moderated nuclear fission reactors are commonly in the form of rods of the metal enclosed in sealed protective envelopes or cans of aluminium, which may be mechanically drawn into close contact with the uranium. Such aluminium-cased uranium bodies as ordinarily prepared have shown an objectionable tendency to develop pimple-like swellings when maintained at raised temperatures, for example, at 300° C., and when under irradiation at temperatures substantially below 300° C.

We have observed that such swellings are due to the local formation of an alloy of uranium and aluminium and it is our opinion that such alloy formation occurs at interfaces where close metallic contact (of the order of interatomic distances) between uranium and aluminium occur, for example as a result of abrasion of the aluminium by the uranium during the operations involved in enclosing the uranium in the aluminium envelope, or by chemical reaction involving deposition of uranium or aluminium on each other.

In accordance with the invention local formation of alloy of uranium and aluminium in such uranium bodies is avoided by the interposition between the uranium metal and the aluminium envelope of a film or coating of a substance to prevent close metallic contact of the aluminium and the uranium and/or diffusion of one metal into the other.

Accordingly, the invention consists in a uranium body for use in a nuclear fission reactor, which comprises a mass of uranium enclosed in a sealed envelope of aluminium having between the uranium and aluminium a layer of a substance serving to prevent contact of the aluminium with the uranium.

The substance should be one which permits little or no diffusion of uranium and/or aluminium in it at the operating temperature, and it should preferably be of relatively low thermal-neutron capture cross-section. The substance may be applied as a coating or deposit to the inner wall of the aluminium can and/or to the uranium.

Graphite, preferably employed as a dispersion in a volatile solvent, has been found to be a satisfactory substance. Where graphite is applied to the uranium, it is advantageous to pre-treat the uranium by heating it in air to form an oxide film.

Films of metal, e.g. copper, silver, iron, nickel or cobalt, but preferably of low neutron capture cross-section electrodeposited or evaporated on to uranium rods to be enclosed in aluminium cans have also been found to reduce substantially or inhibit the formation of pimple-like swellings on the canned rods.

The following is a preferred form of the invention, reference being made to the drawing, in which:

FIG. 1 is a perspective view of a canned uranium rod according to the invention; and
FIG. 2 is a cross section of the canned rod of FIG. 1.

A uranium rod 1 is enclosed in a sealed aluminium can 2, and interposed between the rod 1 and can 2 is a layer of graphite 3. It is to be observed that the thickness of the graphite layer and the can 2, as shown in FIG. 2, is greatly exaggerated.

In carrying the invention into effect as applied to the canning of machined cast rods of uranium and employing graphite as coating medium, the rods are first cleaned. Scrubbing in hot water with a bristle brush followed by wiping and degreasing by immersion in benzene may be employed but it is preferred to clean them electrolytically, by anodic treatment in aqueous citric acid solution as described in U.S. patent application Serial No. 118,630, filed September 29, 1949, now Patent No. 2,853,441, after degreasing by immersion in acetone. The rods may then be transferred to a hot air oven maintained at a temperature of about 150° C. to form an oxide coating and then allowed to cool in air. The oxidised rods may then be sprayed, painted or otherwise coated with a dispersion of graphite in an innocuous volatile organic solvent, preferably alcohol, to form a continuous graphite coating over their whole surfaces. The stabilizing agent of the graphite dispersion should be such as not to introduce undesirable quantities of elements having a high competitive absorption for neutrons of thermal energy.

The aluminium cans, in which the graphite coated rods are to be enclosed, may be degreased and then immersed in warm dilute caustic soda solution, washed, immersed in nitric acid solution, again washed and then dried at 100° to 150° C. The cans may then be filled with a dispersion of graphite in a volatile organic liquid, preferably alcohol, emptied and allowed to stand on their open ends on a flat surface to drain. The cans are then heated to remove volatile matter and given a second coating of graphite in the same way.

Caps for the cans are treated with caustic soda solution and nitric acid and washed and dried as described for the cans, and the outside surface of the bases given a coating of graphite by dipping them into a dispersion of graphite, drying in air and heating them.

A uranium rod coated with graphite as described above is introduced into a graphitised can, being forced fully home by use of a tamping bar, hammer and die. The assembly may then be heated to about 500° C. in a container in which a vacuum of less than 1 mm. of mercury is maintained to remove gas and volatile substances. Subsequently, the can is drawn down on to the rod by pressing through a die of the appropriate size. The capped end of the can is turned over and the joint between cap and can is sealed by brazing with aluminium alloy.

For the application of films of copper, silver, nickel or cobalt to uranium rods in accordance with the invention, the uranium rods are preferably cleaned electrolytically, as by anodic treatment in a 10 percent aqueous citric acid solution at ordinary temperature for one or two minutes employing graphite cathodes. The treated bars are rinsed in water and quickly introduced into an electrolyte bath for the electrodeposition of the desired metal, ordinary plating baths and technique being suitable for coating step. The coated uranium rods may then be removed from the bath rinsed in water and acetone, and after drying enclosed in aluminium cans.

Alternatively the metal may be evaporated on to the cleaned uranium surface in vacuo by known methods and the coated uranium enclosed in aluminiun cans.

The following is a preferred way of preparing a uranium rod according to the invention.

Example

A machined rod of uranium is attached at one end to a mild steel carrier to enable the rod to be subjected to the several processing steps without the surface of the rod being touched by hand. The rod in its carrier is then degreased by immersion in acetone for about one minute, and the carrier hung from a central anode bar of an electrolytic cell, having two graphite plates as cathodes arranged on either side of the uranium rod. The latter is completely immersed in an electrolyte consisting of a 10 percent aqueous citric acid solution. Electrolysis is carried out at room temperature for one or two minutes. The rod in its carrier on removal from the cell is rinsed in water, drained and immersed in water free acetone, for a period of up to 2 hours.

The rod is placed in a hot air oven maintained at substantially 150° C. for 45 minutes and allowed to cool freely in air. The treatment gives an oxide film of approximately 0.0002 inch radial thickness.

A film of graphite of from 0.0006 inch to 0.001 inch in radial thickness is applied by spraying the rod with an alcoholic dispersion of graphite, for example a dispersion prepared by mixing one part "DAG Dispersion No. 154, of Acheson Colloids Corporation," and 1 part methylated spirit. The rod is then removed from its carrier and being handled with a cotton cloth is painted with the above mentioned dispersion of graphite on the end that was covered by the carrier.

A preferred way of providing an aluminium can with a coating of graphite is as follows. Degreasing of the can is effected in trichlorethylene vapour and then liquid trichlorethylene, 5 minutes' treatment in each being given. The can is immersed in a 5 percent aqueous caustic soda solution at approximately 60° C. for substantially two minutes, then washed in water, drained and immersed in a 40 percent to 70 percent nitric acid solution for at least one minute. The can is withdrawn, allowed to drain, washed with cold water and then washed in hot water and after draining dried in an oven 100° C. to 150° C. for at least 20 minutes. A dispersion of collodial graphite in alcohol, preferably made by diluting "DAG Dispersion No. 154, of Acheson Colloids Corporation," with two volumes of 95 percent alcohol is poured into the dried can, sufficient being used to fill the can. The can is emptied, placed open end downwards to drain and then dried in an oven at 100° C. to 150° C. for 30 minutes. The coating is lightly polished by means of a soft cotton cloth and the coating step repeated.

While in the preferred form of the invention a film of graphite is applied to the interior of the can and to the uranium rod, the latter having been previously given an oxide coating, satisfactory canned uranium bodies have been obtained when a graphite film was applied only to the can or to the unoxidised uranium rod or to the oxidised uranium rod.

We claim:

1. A uranium-containing body for use in a nuclear fission reactor, which comprises, a mass of uranium having a coating of graphite enclosed in an envelope of aluminium.

2. A uranium-containing body for use in a nuclear fission reactor, which comprises, a mass of uranium coated with graphite and enclosed in an envelope of aluminium, said envelope being coated on the inside with graphite.

3. A uranium-containing body for use in a nuclear fission reactor, which comprises, a mass of uranium superficially oxidised and having a coating of graphite, said mass of uranium being enclosed in an envelope of aluminium.

4. A method of producing a uranium-containing body for use in a nuclear fission reactor, comprising, cleaning a mass of uranium, heating the uranium to form a superficial oxide coating, applying a dispersion of graphite in a volatile solvent to the mass of uranium to form a continuous film thereon, covering the inside walls of an aluminium can with a film of graphite, introducing the treated uranium mass into the treated can and sealing the can.

5. A fuel element for a nuclear fission reactor, comprising, a rod of uranium carrying a coating of graphite and enclosed in an envelope of aluminium.

6. A fuel element for a nuclear fission reactor, comprising, a rod of uranium, superficially oxidised, and having a coating of graphite enclosed in an envelope of aluminium.

7. A fuel element for a nuclear fission reactor, comprising, a rod of uranium enclosed in an envelope of aluminium, the inner surface of the envelope having a coating of graphite.

References Cited in the file of this patent

FOREIGN PATENTS 861,390  France _____ Oct. 28, 1940